United States Patent
Rylance et al.

(10) Patent No.: US 11,001,174 B2
(45) Date of Patent: May 11, 2021

(54) DOUBLE SIDED CUSHION WITH PROVISION FOR CHILD FIVE POINT HARNESS AND BOOSTER

(71) Applicant: GM Global Technology Operations LLC, Detroit, MI (US)

(72) Inventors: Stephen Rylance, Holly, MI (US); Stephanie C. Radion, Bloomfield Hills, MI (US); Daniel W. Booth, Troy, MI (US); Shaun P. Kavanagh, Clinton Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 44 days.

(21) Appl. No.: 16/180,437

(22) Filed: Nov. 5, 2018

(65) Prior Publication Data

US 2020/0139857 A1 May 7, 2020

(51) Int. Cl.
*B60N 2/26* (2006.01)
*B60N 2/32* (2006.01)
*B60N 2/68* (2006.01)
*B60R 11/00* (2006.01)
*B60N 3/06* (2006.01)

(52) U.S. Cl.
CPC ........... *B60N 2/265* (2013.01); *B60N 2/32* (2013.01); *B60N 2/682* (2013.01); *B60N 3/06* (2013.01); *B60R 11/00* (2013.01); *B60R 2011/0012* (2013.01)

(58) Field of Classification Search
None
See application file for complete search history.

(56) References Cited

U.S. PATENT DOCUMENTS

| | | | | |
|---|---|---|---|---|
| 1,887,947 | A * | 11/1932 | Savale | B60N 2/3011 297/15 |
| 5,409,293 | A * | 4/1995 | Nagasaka | B60N 2/26 297/105 |
| 5,997,083 | A * | 12/1999 | Ono | B60N 2/309 297/236 |
| 6,102,463 | A * | 8/2000 | Swanson | B60N 2/3013 296/37.15 |
| 7,093,899 | B2 * | 8/2006 | Fisher | B60N 2/3065 297/334 |
| 9,586,507 | B2 * | 3/2017 | Correia | B60N 2/919 |

(Continued)

FOREIGN PATENT DOCUMENTS

| | | |
|---|---|---|
| EP | 1893454 B1 | 3/2014 |
| EP | 3083326 B1 | 8/2017 |
| FR | 2663889 A1 | 1/1992 |

*Primary Examiner* — David R Dunn
*Assistant Examiner* — Christopher E Veraa (57) ABSTRACT

A vehicle seat system includes a seat back. A seat cushion is positioned proximate to the seat back. The seat cushion includes: a first side configured when upwardly directed for supporting an adult passenger; and a second side oppositely facing from the first side. The second side is configured when upwardly directed for supporting a child passenger and includes: an elevated face positioned proximate to the seat back; and a lower elevation face forward of the elevated face at a lower elevation than the elevated face when the second side is upwardly directed. The seat cushion is releasable and rotatable to configure the seat cushion with either the first side or the second side upwardly directed.

17 Claims, 4 Drawing Sheets

(56) References Cited

U.S. PATENT DOCUMENTS

| | | | |
|---|---|---|---|
| 9,676,301 B2* | 6/2017 | Sam | B60N 2/30 |
| 2016/0016487 A1* | 1/2016 | Correia | B60N 2/015 |
| | | | 297/94 |
| 2018/0178684 A1* | 6/2018 | Virdis | B60N 2/2887 |
| 2020/0009998 A1* | 1/2020 | Kakishima | B60N 2/995 |

* cited by examiner

ND SIDED CUSHION WITH
PROVISION FOR CHILD FIVE POINT
HARNESS AND BOOSTER

INTRODUCTION

The present disclosure relates to seat configuration, passenger restraint devices and seat support configurations for vehicle passenger seats.

Automobile vehicles, including shared-ride vehicles are required to provide occupant restraint systems. Vehicle users with children requiring a vehicle safety seat are commonly required to bring their own child seat for vehicle use and then carry the child seat after arrival at their destination. The seatbelt configuration of shared-ride vehicles is normally configured for adults, therefore significant time is often required for a user with a child seat to reconfigure the seat belt arrangement, including adding necessary extenders or coupling members to load the child seat. Features such as seatbelt extenders may or may not be accessible in the vehicle or may be missing after a previous use without proper re-stowage. Adult passengers who enter the vehicle at a later time may also find the reconfigured seatbelt arrangement inappropriate for ease of use. This loading and unloading situation is time intensive, detracts from the shared-ride convenience and may also impact arrival or departure of other passengers in the vehicle.

Thus, while current shared-ride vehicle seating configurations achieve their intended purpose, there is a need for a new and improved system and method for accommodating shared-ride child seating.

SUMMARY

According to several aspects, a vehicle seat system, includes a seat back. A seat cushion is positioned proximate to the seat back. The seat cushion includes: a first side configured when upwardly directed for supporting an adult passenger; and a second side oppositely facing from the first side, the second side configured when upwardly directed for supporting a child passenger. The seat cushion includes a rear cushion surface facing the seat back when either the first side or the second side is upwardly directed, the seat cushion releasable and rotatable to configure the seat cushion with either the first side or the second side upwardly directed.

In another aspect of the present disclosure, the second side includes an elevated face positioned proximate to the seat back and a lower elevation face forward of the elevated face at a lower elevation than the elevated face when the second side is upwardly directed.

In another aspect of the present disclosure, the lower elevation face defines a storage door normally closed to cover a footrest bin within the seat cushion.

In another aspect of the present disclosure, a restraint system is normally stored predominantly within the footrest bin and deployed after opening the storage door to engage the child passenger.

In another aspect of the present disclosure, at least one hinge is provided, with the storage door rotatably coupled to a front cushion surface by the at least one hinge.

In another aspect of the present disclosure, a restraint system is adapted for use by the child passenger when the second side of the seat cushion is upwardly directed. The restraint system includes a five-point buckle and each of: a right-hand shoulder strap extended through one of multiple first slots created in the seat back and releasably coupled to the five-point buckle; and a left-hand shoulder strap extending through one of multiple second slots created in the seat back also releasably coupled to the five-point buckle.

In another aspect of the present disclosure, a horse-shoe shaped housing is provided on each of a first side wall and an opposed second side wall of the seat cushion. The housing defines an arc shaped wall having an opening through which an angled pin is received or exits to releasably mount the seat cushion.

In another aspect of the present disclosure, the seat cushion includes a latching assembly having opposed first and second latching members extending from an end wall of the seat cushion each received in a correspondingly shaped opening created in the seat back, each of the first and second latching members including a U-shaped slot provided at a free end.

In another aspect of the present disclosure, a wire is positioned within the seat back and received in the U-shaped slot of the first latching member and the second latching member. The wire is releasably captured by opposed pins located in each U-shaped slot to retain the seat cushion in contact with the seat back.

In another aspect of the present disclosure, a release handle is located oppositely to the end wall which is connected to and acts when engaged to disengage the opposed pins allowing the wire to exit from the U-shaped slots, thereby allowing the seat cushion to be released.

In another aspect of the present disclosure, the seat cushion further includes a first D-shaped member and a second D-shaped member extending outwardly from an end wall of the seat cushion, each of the first D-shaped member and the second D-shaped member defining an enclosed cavity into which is received a releasable latch member to releasable couple the seat cushion against the seat back.

In another aspect of the present disclosure, a first T-shaped hook member and a second T-shaped hook member each extend outward from an end wall of the seat cushion. Each of the first and second hook members have a first hook-shaped end and an oppositely directed second hook-shaped end, each of the first and second hook-shaped ends defining a partial cavity. A wire positioned within the seat back is received in the partial cavity of the first and second hook-shaped ends to releasably connect the seat cushion to the seat back.

In another aspect of the present disclosure, a first adjustable seat retention member and a second adjustable seat retention member extend outward from an end wall of the seat cushion each including a connecting end releasably fixed into the seat back.

In another aspect of the present disclosure, a threaded shank extends from the connecting end threadably engaged in a threaded bore opening at the end wall. The seat cushion is rotated with respect to the threaded shank, the threaded shank permitting rotation of the seat cushion and permitting displacement of the seat cushion inward or outward with respect to the seat back.

According to several aspects, a vehicle seat system includes a seat back. A seat cushion is positioned proximate to the seat back. The seat cushion includes: a first side configured when upwardly directed for supporting an adult passenger; and a second side oppositely facing from the first side. The second side is configured when upwardly directed for supporting a child passenger and includes: an elevated face positioned proximate to the seat back; and a lower elevation face forward of the elevated face at a lower elevation than the elevated face when the second side is upwardly directed. The seat cushion is releasable and rotatable to configure the seat cushion with either the first side or the second side upwardly directed.

In another aspect of the present disclosure, the seat cushion includes: a rear cushion surface facing the seat back when either the first side or the second side is upwardly directed; and a horse-shoe shaped housing provided on each of a first side wall and an opposed second side wall of the seat cushion, the housing defining an arc shaped wall having an opening through which an angled pin is received or exits to releasably mount the seat cushion.

In another aspect of the present disclosure, the seat cushion includes: a rear cushion surface facing the seat back when either the first side or the second side is upwardly directed, and a release system extending from the rear cushion surface received in the seat back and having an engagement feature to releasably couple the release system to the seat back.

According to several aspects, a vehicle seat system includes a seat back. A seat cushion is positioned proximate to the seat back. The seat cushion includes: a first side configured when upwardly directed for supporting an adult passenger; and a second side oppositely facing from the first side. The second side is configured when upwardly directed for supporting a child passenger and includes: an elevated face positioned proximate to the seat back; and a lower elevation face forward of the elevated face at a lower elevation than the elevated face when the second side is upwardly directed. The lower elevation face defines a storage door normally closed to cover a footrest bin within the seat cushion. A restraint system is normally stored predominantly within the footrest bin. The seat cushion includes a rear cushion surface facing the seat back when either the first side or the second side is upwardly directed, the seat cushion releasable and rotatable to configure the seat cushion with either the first side or the second side upwardly directed.

In another aspect of the present disclosure, a release system extending from the rear cushion surface received in the seat back and having an engagement feature to releasably couple the release system to the seat back.

In another aspect of the present disclosure, the restraint system includes a five-point buckle. A right-hand shoulder strap extends through one of multiple first slots successively vertically arranged in the seat back and is releasably coupled to the five-point buckle. A left-hand shoulder strap extends through one of multiple second slots successively vertically arranged in the seat back, each aligned with one of the multiple first slots. The left-hand shoulder strap is also releasably coupled to the five-point buckle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figures 1, 2, 3:
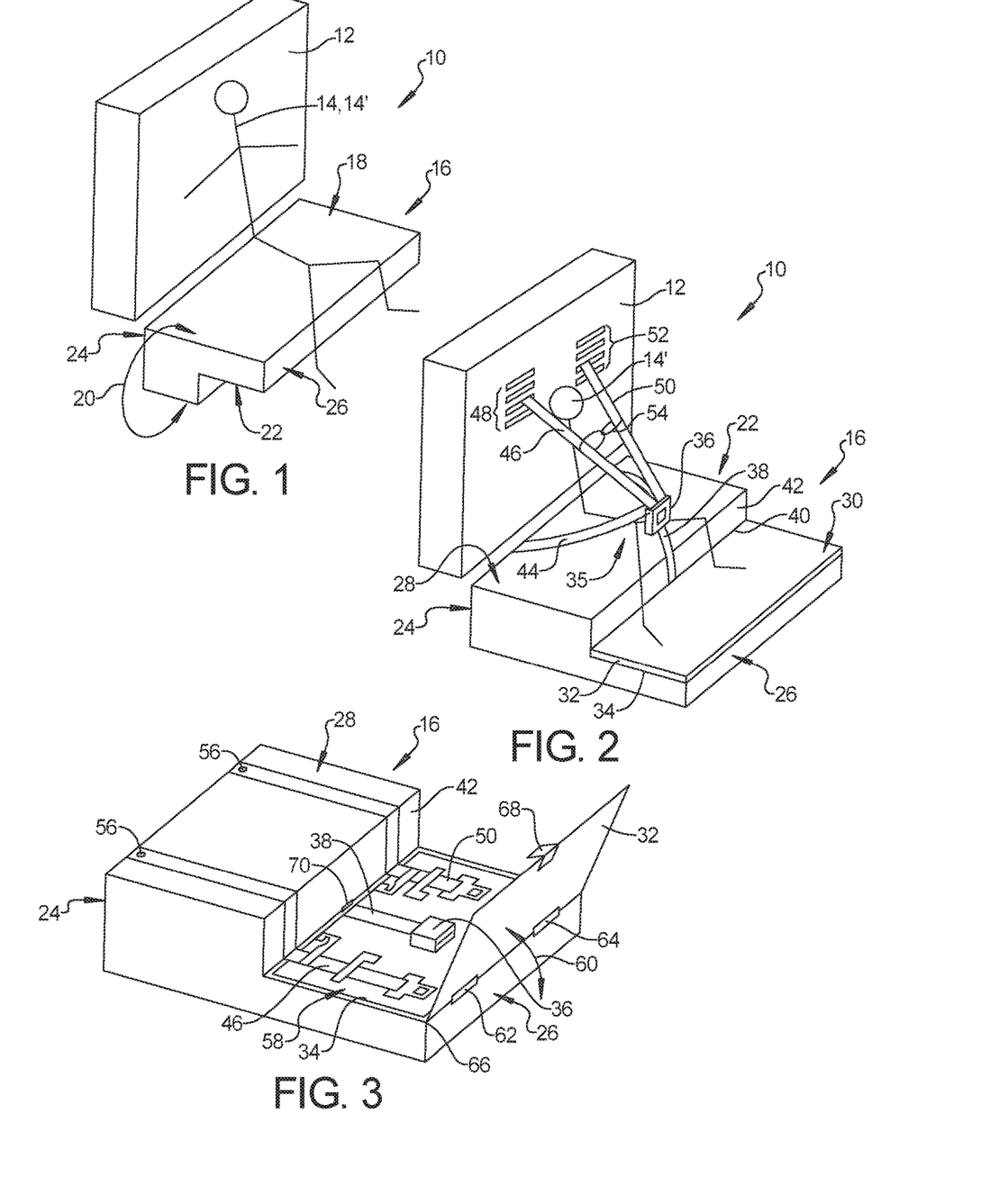
FIG. 1 is a front right perspective view of a vehicle seat system configured for adult passenger seating according to an exemplary embodiment.
FIG. 2 is a front right perspective view of the vehicle seat system of FIG. 1 reconfigured for child passenger seating.
FIG. 3 is a front right perspective view of the seat cushion of the vehicle seat system of FIG. 2 with a storage door in an open position.

Referring to FIG. 1, a vehicle seat system 10 includes a seat back 12 providing back support for a seat occupant 14 and a double-sided cushion assembly defining a seat cushion 16 upon which the occupant 14 is seated. The occupant 14 can be either an adult occupant 14 or a child occupant 14' of varying size. When in a first orientation shown, the seat cushion 16 provides a first surface 18 facing upward as viewed in FIG. 1 in a normal orientation adapted to support the adult occupant 14. The seat cushion 16 is also reversible by rotation about a rotational arc 20 such that a second surface 22 having different elevated faces will face upward, as described in greater detail in reference to FIG. 2 and adapted to support a child occupant 14'. A rear cushion surface 24 is positioned proximate the seat back 12, and a front cushion surface 26 faces forward or generally to the right as viewed in FIG. 1.

Referring to FIG. 2 and again to FIG. 1, the seat cushion 16 is shown in a rotated second orientation wherein the second surface 22 faces upward as viewed in FIG. 2, and therefore has the first surface 18 oppositely facing downward. In the rotated second orientation the rear cushion surface 24 remains positioned proximate the seat back 12, and the front cushion surface 26 continues to face forward. In the second orientation a raised or elevated face 28 is positioned proximate the seat back 12 on which the child occupant 14' is seated, and a lower elevation face 30 at a lower elevation than the elevated face 28 is positioned forward of the elevated face 28, upon which the feet of the child occupant 14' are supported. In the second orientation the lower elevation face 30 is provided by a storage door 32 which is normally closed as shown to cover a footrest bin 34 shown and described in greater detail in reference to FIG. 3.

A restraint system 35 normally stored predominantly within the footrest bin 34 of the seat cushion 16 is shown in a deployed position. The restraint system 35 includes a five-point buckle 36 fixed to a crotch strap 38, which extends upward through a joint 40 located between the storage door 32 and a connecting wall 42 which joins the footrest bin 34 to the elevated face 28. A hip-strap belt 44 extends from a connected position on the rear cushion surface 24 and releasably couples to the five-point buckle 36. A user selectively extends a first or right-hand shoulder strap 46 through one of multiple horizontal slots 48 successively vertically arranged in the seat back 12 and releasably couples the right-hand shoulder strap 46 to the five-point buckle 36. The user also selectively extends a second or left-hand shoulder strap 50 through one of multiple horizontal slots 52 successively vertically arranged in the seat back 12, each aligned with one of the multiple first horizontal slots, and also releasably couples the left-hand shoulder strap 50 to the five-point buckle 36.

The multiple slots 48 and the multiple slots 52 are paired at sequentially elevated positions to allow for differences in height of the child occupant 14' seated on the seat cushion 16. A chest clip 54 is slidably mounted and movable upward or downward on each of the right-hand shoulder strap 46 and the left-hand shoulder strap 50. The chest clip 54 allows moving the right-hand shoulder strap 46 and the left-hand shoulder strap 50 closer together or further apart from each other on the chest and under the head of the child occupant 14' seated on the elevated face 28 of the seat cushion 16. The feet of the child occupant 14' are supported on the lower elevation face 30 defined by the storage door 32 which is closed over the footrest bin 34.

Referring to FIG. 3 and again to FIG. 2, the storage door 32 is rotated to an open position presenting the restraint system 35 shown in its normally stored position within the footrest bin 34. A distal end of each of the right-hand shoulder strap 46 and the left-hand shoulder strap 50 is fixed to the elevated face 28 of the seat cushion 16 using a fastener 56. The fasteners 56 are positioned proximate to the rear cushion surface 24. Portions of the right-hand shoulder strap 46 and the left-hand shoulder strap 50, and the five-point buckle 36 and crotch strap 38 rest on an inner lower surface 58 of the footrest bin 34. The storage door 32 is rotatably moved from the stored position shown in FIG. 2 to an open position shown in FIG. 3 by rotation about an arc of rotation 60. The storage door 32 is rotatably connected using a first hinge 62 and a second hinge 64 to a corner 66 of the front cushion surface 26. A releasable member 68 such as a snap-fit device normally engaged with a latch member 70 is released to permit the storage door 32 to rotate to the open position or is engaged with the latch member 70 to releasably hold the storage door 32 in the stored position shown in FIG. 2.

Referring to FIG. 4 and again to FIGS. 2 and 3, a first release system for connecting the seat cushion 16 to the seat back 12 permits rotation about the rotational arc 20 between the first orientation shown on the left and the second orientation shown on the right is provided. The first release system includes provision of an angled pin 72 in structure (not shown) of a seat frame assembly that releasably engages with the seat cushion 16 providing either the first orientation or the second orientation. Each of a first side wall 74 and an opposed second side wall 76 of the seat cushion 16 receive one of the angled pins 72. The seat cushion 16 is released from a seating position by initially rotating in an arc of rotation 78.

Figure 4:
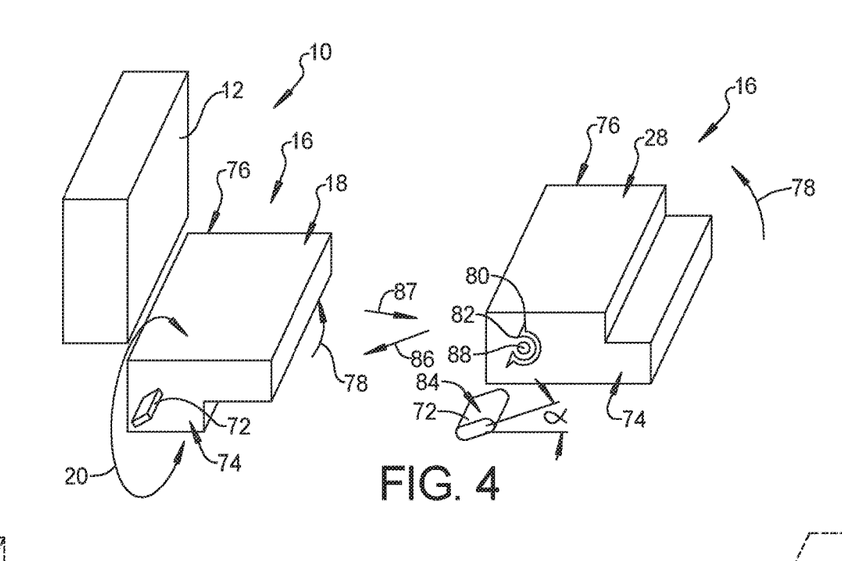
FIG. 4 is a front right perspective view of the vehicle seat system of FIG. 1 providing a first method of seat cushion mounting.

A U-shaped or horse-shoe shaped housing 80 is provided on each of the first side wall 74 and the opposed second side wall 76. The housing 80 defines an arc shaped wall having an opening 82 through which one of the angled pins 72 is received or exits. Each of the first side wall 74 and the opposed second side wall 76 include a face 84 oriented at an angle alpha ($\alpha$) ranging between approximately 20 to approximately 60 degrees inclusive with respect to horizontal. To either install the seat cushion 16 or release the seat cushion 16, the seat cushion is rotated in the arc of rotation 78 to approximately the angle $\alpha$.

For installation, the seat cushion 16 rotated to the angle $\alpha$ is then moved in an installation direction 86 substantially parallel to the angle $\alpha$ until the angled pin 72 is received through the opening 82, and the seat cushion 16 is then rotated to a horizontal or seating orientation shown. The opening 82 is oriented such that the angled pin 72 can only be received in or released through the opening 82 when the seat cushion 16 is rotated to the angle $\alpha$. After the seat cushion 16 is then rotated to the horizontal or seating orientation shown, the angled pin 72 prevents release of the seat cushion in a horizontal direction 87. A frictional engagement member 88 can also be provided on each of the first side wall 74 and the opposed second side wall 76 within the housing 80 to partially receive and therefore engage the angled pins 72 in the seating orientation of the seat cushion 16.

Referring to FIG. 5 and again to FIGS. 1 through 4, a vehicle seat system 90 is modified from the vehicle seat system 10 to provide a second release system for releasably connecting a seat cushion 92 to a seat back 94. The seat cushion 92 is similar to the seat cushion 16, therefore only the differences will be further discussed. The seat cushion 92 includes a latching assembly 96 having opposed latching members, only a first latching member 98 being visible in this view, which are received in correspondingly shaped openings such as an opening 100 created in the seat back 94 in the seat cushion seating position shown.

Figure 5:
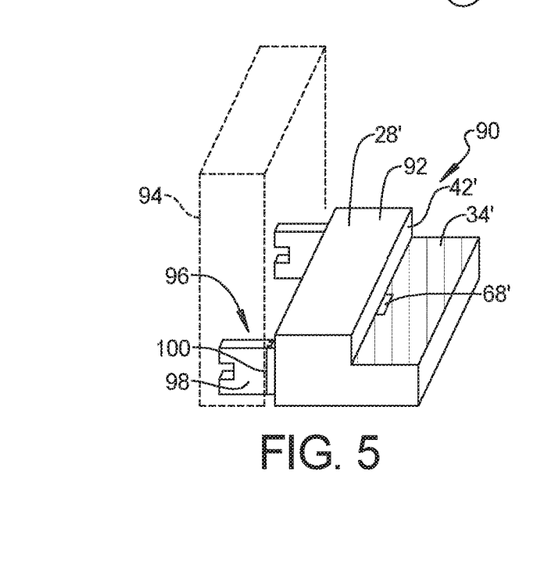
FIG. 5 is a front right perspective view of the vehicle seat system of FIG. 1 providing a second method of seat cushion mounting and configured for child passenger seating.

Referring to FIG. 6 and again to FIG. 5, the seat cushion 92 also includes a second latching member 102 which is identical to the first latching member 98. The first latching member 98 and the second latching member 102 are spaced apart from each other and extend outwardly from an end wall 104 of the seat cushion 92. When the seat cushion 92 is positioned with the end wall 104 in abutment with the seat back 94 and each of the first latching member 98 and the second latching member 102 are received in the openings such as the opening 100 shown in reference to FIG. 5, a tube or wire, hereinafter collectively referred to as a wire 106 within the seat back 94 is received in a U-shaped slot 108 provided at the free end of each of the first latching member 98 and the second latching member 102. The wire 106 is captured by opposed pins 110 located in each of the slots 108 to retain the seat cushion 92 in contact with the seat back 94. The seat cushion 92 is released by pulling outwardly (to the right as viewed in FIG. 6) on a release handle 112 located oppositely to the end wall 104 which is connected to and disengages the opposed pins 110 allowing the wire 106 to exit from the slots 108.

Referring to FIG. 7 and again to FIGS. 1 through 6, a vehicle seat system 114 is modified from the vehicle seat systems 10 and 90 to provide a third release system for releasably connecting a seat cushion 116 to a seat back 118 (shown in phantom for clarity). In place of the first latching member 98 and the second latching member 102, the seat cushion 116 provides a first D-shaped member 120 and a second D-shaped member 122 spaced apart from each other and extending outwardly from an end wall 124 of the seat cushion 114. Each of the first D-shaped member 120 and the second D-shaped member 122 define an enclosed cavity 126 into which is received a releasable latch member 128 provided with the seat back 118, which can be released from a rear side of the seat back 118 by a release handle (not visible in this view) similar to the release handle 112 described in reference to FIG. 6.

Referring to FIG. 8 and again to FIGS. 1 through 3, a seat cushion 130 is modified from the seat cushions 16, 92, 114 to provide a fourth release system for connecting the seat cushion 130 to a seat back (not shown for clarity). The seat cushion 130 provides an elevated face 132 similar to the elevated face 28, a lower elevation face 134 similar to the lower elevation face 30 and a surface 136 similar to the first surface 18. The seat cushion 130 is attached and held in position against the seat back using a first T-shaped hook member 138 and a second T-shaped hook member 140 each extending outward from an end wall 142. Each of the first and second hook members 138, 140 are similar, therefore the following discussion of the first hook member 138 applies to the second hook member 140. Hook member 138 includes a first hook-shaped end 144 and an oppositely directed second hook-shaped end 146, both integrally connected to a central web 148. Each of the first and second hook-shaped ends 144, 146 provides a partial cavity 150.

Figure 6:
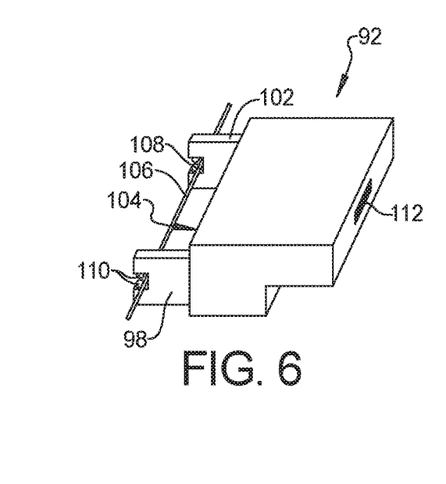
FIG. 6 is a front right perspective view of the vehicle seat system of FIG. 5 configured for adult passenger seating.
Figure 7:
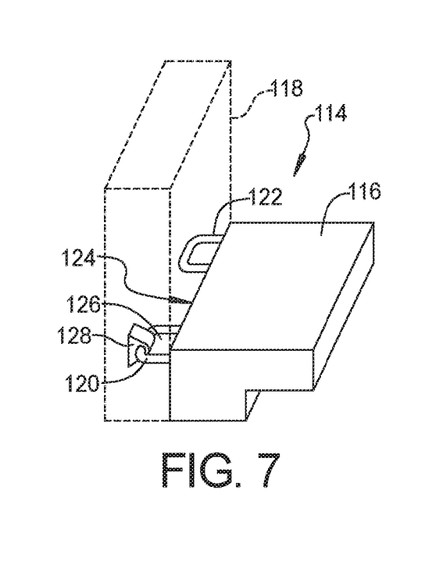
FIG. 7 is a front right perspective view of a vehicle seat system modified from FIG. 1 to provide another method of seat cushion mounting.
Figure 8:
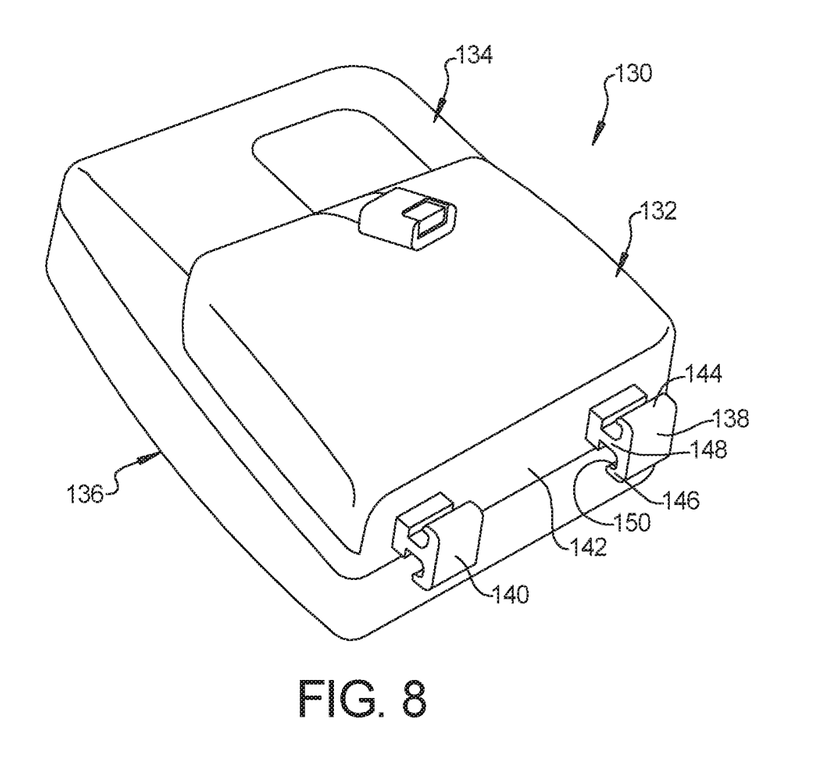
FIG. 8 is a rear left perspective view of a vehicle seat system modified from FIG. 1 to provide another method of seat cushion mounting.

Referring to FIG. 9 and again to FIG. 8, each of the first and second hook-shaped ends 144, 146 provides the partial cavity 150 which is adapted to receive a tube or wire 152 similar to the wire 106 described in reference to FIG. 6. The seat cushion 130 is releasably held in position with the elevated face 132 and the lower elevation face 134 both directed upward as shown in FIG. 9 for support of a child passenger with the wire 152 engaged in the partial cavity 150 of the first hook-shaped end 144 of both the first T-shaped hook member 138 and the second T-shaped hook member 140.

Figure 9:
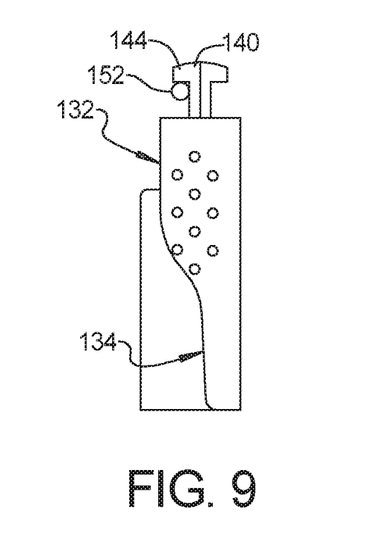
FIG. 9 is a side elevational view of the vehicle seat system of FIG. 8 configured for child passenger seating.
Figure 10:
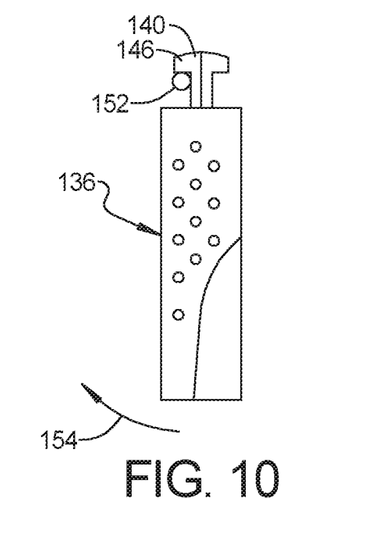
FIG. 10 is a side elevational view of the vehicle seat system of FIG. 8 configured for adult passenger seating.

Referring to FIG. 10 and again to FIGS. 8 and 9, the seat cushion 130 is releasably held in position with the surface 136 directed upward as shown in FIG. 9 for support of an adult passenger, with the wire 152 engaged in the partial cavity 150 of the second hook-shaped end 146 of both the first T-shaped hook member 138 and the second T-shaped hook member 140. The seat cushion 130 can be removed from the installed position and rotated or flipped over by first rotating the seat cushion 130 about an arc of rotation 154 to allow the wire 152 to be released from within the partial cavity 150 of the second hook-shaped end 146 of both the first T-shaped hook member 138 and the second T-shaped hook member 140.

Referring to FIGS. 11 through 13 and again to FIG. 8, a seat cushion 130' is modified from the seat cushion 130 to provide a fifth release system for connecting the seat cushion 130' to a seat back (not shown for clarity), with common parts identified by an accent mark. An adjustable seat retention member 156 is used in two locations in lieu of each of the first T-shaped hook member 138 and the second T-shaped hook member 140 and extend outward from the end wall 142'. Each seat retention member 156 includes a connecting end 158 which is releasably fixed into a seat back (not shown for clarity). A threaded shank 160 extends from the connecting end 158 which is threadably engaged in a threaded bore 162 which opens at the end wall 142'. The seat cushion 130' is rotated with respect to the threaded shank 160 which displaces the seat cushion 130' inward or outward with respect to the seat back in the direction of directional arrows 166.

Figure 11:
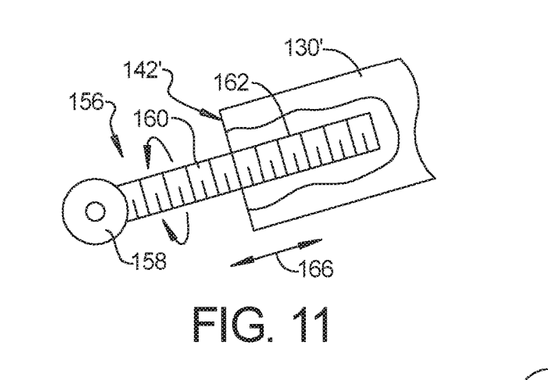
FIG. 11 is a partial cross-sectional side elevational view of a vehicle seat system providing another method of seat cushion mounting.

Referring more specifically to FIG. 12 and again to FIG. 11, the surface 136' of the seat cushion 130' can be oriented to face upward and the lower elevation face 134' oriented to face downward by one of two means. First, the seat cushion 130' can be removed and the connecting end 158 axially rotated and the seat cushion 130' can be re-connected to the seat back. Second, with the connecting end 158 retained in place in the seat back, the seat cushion 130' can itself be axially rotated. The seat cushion 130' is also tightened up against the seat back by continued rotation of the threaded shank 160 with respect to the threaded bore 162.

Figure 12:
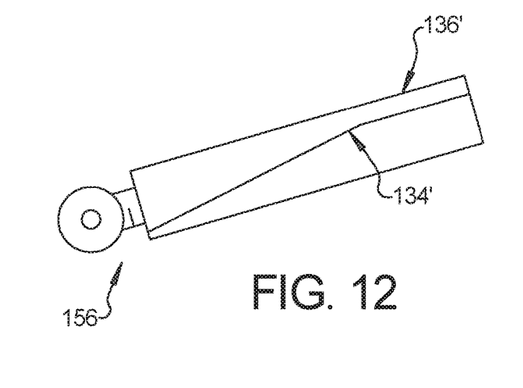
FIG. 12 is a side elevational view of the vehicle seat system of FIG. 11 configured for adult passenger seating.
Figure 13:
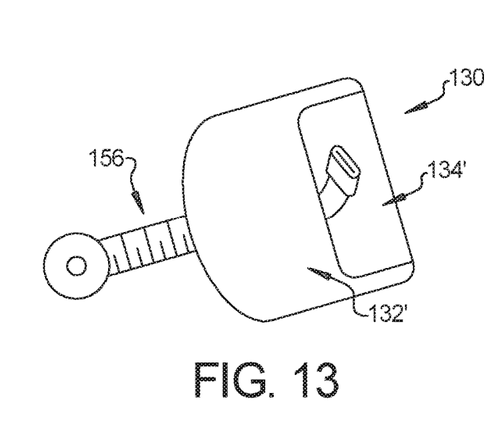
FIG. 13 is a side elevational view of the vehicle seat system of FIG. 11 configured for child passenger seating.

Referring more specifically to FIG. 13 and again to FIGS. 11 and 12, the surface 136' of the seat cushion 130' (not visible in this view) can be oriented to face downward and both the elevated face 132' and the lower elevation face 134' oriented to face upward by either one of the two means described above with respect to FIG. 13. The seat cushion 130' is thereby oriented to support a child passenger.

Figure 14:
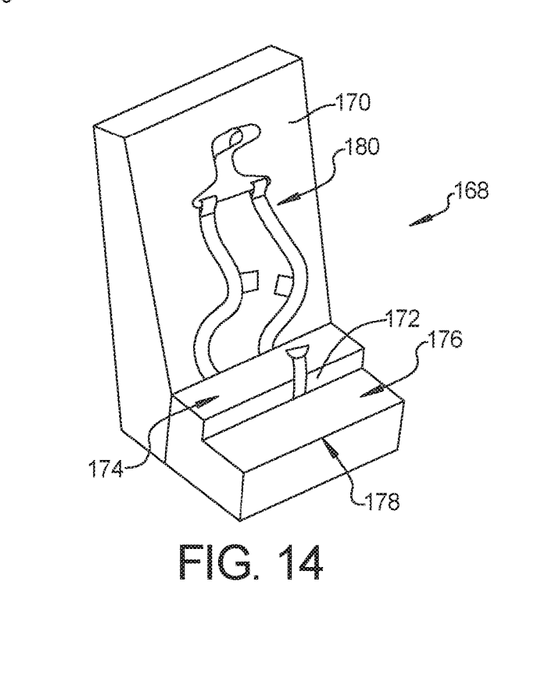
FIG. 14 is a front right perspective view of a vehicle bucket seat system configurable for both child and adult passenger seating.

Referring to FIG. 14 and again to FIGS. 1 through 13, a vehicle seat system 168 includes a seat 170 having a reversible seat cushion 172 similar to the seat cushion 16. The seat cushion 172 is shown in a child passenger configuration having an elevated face 174 and a lower elevation face 176 similar to the elevated face 28 and the lower elevation face 30 of the seat cushion 16. A first surface 178 shown facing downward is similar to the first surface 18 and can be reconfigured to face upward for supporting an adult passenger. A deployed restraint system 180 is similar to the restraint system 35 and can be stored within the seat cushion 172 when the seat cushion 172 is used for adult passengers.

A vehicle seat system of the present disclosure offers several advantages. These include a double-sided seat seat cushion having a first side supporting adult occupants while a second side provides for child passengers including having a booster and a 5-harness restraining system. The harness restraining system is fully integrated and structurally attached to the seat cushion and therefore does not affect the appearance of the seat cushion or comfort when configured for adult passengers because it is stored on an underside of the seat cushion out of sight and away from the adult occupant when not in use. The vehicle seat system is fully adjustable to varying sizes of child occupants, utilizes existing structural attachment points without the need for seat modifications and can be integrated in any seat.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vehicle seat system, comprising:
a seat back; and
a seat cushion positioned proximate to the seat back, the seat cushion having:
  a first side configured when upwardly directed for supporting an adult passenger; and
  a second side oppositely facing from the first side, the second side configured when upwardly directed for supporting a child passenger;
wherein the seat cushion includes a footrest bin within the seat cushion and a rear cushion surface facing the seat back when either the first side or the second side is upwardly directed, the seat cushion releasable from the seat back and rotatable to configure the seat cushion with either the first side or the second side upwardly directed;

wherein the second side includes an elevated face positioned proximate to the seat back and a lower elevation face forward of the elevated face at a lower elevation than the elevated face when the second side is upwardly directed, and wherein the lower elevation face defines a storage door normally closed to cover the footrest bin within the seat cushion.

2. The vehicle seat system of claim 1, further including a restraint system normally stored within the footrest bin and deployed after opening the storage door to engage the child passenger.

3. The vehicle seat system of claim 1, further including at least one hinge, wherein the storage door is rotatably coupled to a front cushion surface by the at least one hinge.

4. The vehicle seat system of claim 1, further including a restraint system adapted for use by the child passenger when the second side of the seat cushion is upwardly directed, wherein the restraint system includes a five-point buckle and each of:
a right-hand shoulder strap extended through one of multiple first slots created in the seat back and releasably coupled to the five-point buckle; and
a left-hand shoulder strap extending through one of multiple second slots created in the seat back also releasably coupled to the five-point buckle.

5. The vehicle seat system of claim 1, further including:
an angled pin extending from a seat frame assembly; and
a horse-shoe shaped housing provided on each of a first side wall and an opposed second side wall of the seat cushion, the housing defining an arc shaped wall having an opening through which the angled pin is received or exits to releasably mount the seat cushion.

6. The vehicle seat system of claim 1, wherein the cushion includes a latching assembly having opposed first and second latching members extending from the rear cushion surface of the seat cushion each received in a correspondingly shaped opening created in the seat back, each of the first and second latching members including a U-shaped slot provided at a free end.

7. The vehicle seat system of claim 6, further including a wire positioned within the seat back received in the U-shaped slot of the first latching member and the second latching member, the wire releasably captured by opposed pins located in each U-shaped slot to retain the seat cushion in contact with the seat back.

8. The vehicle seat system of claim 7, further including a release handle located oppositely to the rear cushion surface which is connected to and acts when engaged to disengage the opposed pins allowing the wire to exit from the U-shaped slots, thereby allowing the seat cushion to be released.

9. The vehicle seat system of claim 1, wherein the seat cushion further includes a first D-shaped member and a second D-shaped member extending outwardly from the rear cushion surface of the seat cushion, each of the first D-shaped member and the second D-shaped member defining an enclosed cavity into which is received a releasable latch member to releasably couple the seat cushion against the seat back.

10. The vehicle seat system of claim 1, further including:
a first T-shaped hook member and a second T-shaped hook member each extending outward from the rear cushion surface of the seat cushion, each of the first and second hook members having a first hook-shaped end and an oppositely directed second hook-shaped end, each of the first and second hook-shaped ends defining a partial cavity; and
a wire positioned within the seat back received in the partial cavity of the first and second hook-shaped ends to releasably connect the seat cushion to the seat back.

11. The vehicle seat system of claim 1, further including a first adjustable seat retention member and a second adjustable seat retention member extending outward from the rear cushion surface of the seat cushion each including a connecting end releasably fixed into the seat back.

12. The vehicle seat system of claim 11, further including a threaded shank extending from the connecting end threadably engaged in a threaded bore opening at the rear cushion surface, wherein the seat cushion is rotated with respect to the threaded shank, the threaded shank permitting rotation of the seat cushion.

13. A vehicle seat system, comprising:
a seat back;
a seat cushion positioned proximate to the seat back, the seat cushion having:
a first side configured when upwardly directed for supporting an adult passenger;
a second side oppositely facing from the first side, the second side configured when upwardly directed for supporting a child passenger and including:
an elevated face positioned proximate to the seat back; and
a lower elevation face forward of the elevated face at a lower elevation than the elevated face when the second side is upwardly directed;
a rear cushion surface facing the seat back when either the first side or the second side is upwardly directed, and
a release system extending from the rear cushion surface received in the seat back and having an engagement feature to releasably couple the release system to the seat back;
wherein the seat cushion is releasable and rotatable to configure the seat cushion with either the first side or the second side upwardly directed.

14. The vehicle seat system of claim 13, wherein the seat cushion includes:
an angled pin extending from a seat frame assembly; and
a horse-shoe shaped housing provided on each of a first side wall and an opposed second side wall of the seat cushion, the housing defining an arc shaped wall having an opening through which the angled pin is received or exits to releasably mount the seat cushion.

15. A vehicle seat system, comprising:
a seat back;
a seat cushion positioned proximate to the seat back, the seat cushion having:
a first side configured when upwardly directed for supporting an adult passenger;
a second side oppositely facing from the first side, the second side configured when upwardly directed for supporting a child passenger and including:
an elevated face positioned proximate to the seat back;
a lower elevation face forward of the elevated face at a lower elevation than the elevated face when the second side is upwardly directed; and
the lower elevation face defines a storage door normally closed to cover a footrest bin within the seat cushion; and
a restraint system stored within the footrest bin;
wherein the seat cushion includes a rear cushion surface facing the seat back when either the first side or the second side is upwardly directed, the seat cushion releasable and rotatable to configure the seat cushion with either the first side or the second side upwardly directed.

16. The vehicle seat system of claim 15, further including a release system extending from the rear cushion surface received in the seat back and having an engagement feature to releasably couple the release system to the seat back.

17. The vehicle seat system of claim 15, wherein the restraint system includes:
- a five-point buckle;
- a right-hand shoulder strap extended through one of multiple first slots successively vertically arranged in the seat back and releasably coupled to the five-point buckle; and
- a left-hand shoulder strap extending through one of multiple second slots successively vertically arranged in the seat back, each aligned with one of the multiple first slots, the left-hand shoulder strap also releasably coupled to the five-point buckle.

* * * * *